United States Patent [19]

Boots

[11] Patent Number: 4,844,534
[45] Date of Patent: Jul. 4, 1989

[54] OPEN ROOF CONSTRUCTION FOR A VEHICLE

[75] Inventor: Robert T. Boots, Haarlem, Netherlands

[73] Assignee: Vermeulen-Hollandia Octrooien II B.V., Netherlands

[21] Appl. No.: 67,704

[22] Filed: Jun. 29, 1987

[51] Int. Cl.⁴ .................................................. B60J 7/05
[52] U.S. Cl. ...................................... 296/214; 296/221; 296/216; 296/223
[58] Field of Search .............. 296/211, 213, 214, 220, 296/221, 223, 216

[56] References Cited

U.S. PATENT DOCUMENTS

| | | | |
|---|---|---|---|
| 3,888,165 | 6/1975 | Hattass et al. | 296/107 X |
| 4,175,784 | 11/1979 | Schatzler et al. | 296/222 X |
| 4,320,921 | 3/1982 | Schatzler | 296/214 X |
| 4,601,512 | 7/1986 | Boots | 296/221 |
| 4,671,564 | 6/1987 | Sumida et al. | 296/223 X |

FOREIGN PATENT DOCUMENTS 8403741  7/1986  Netherlands ........................ 296/221

Primary Examiner—Dennis H. Pedder
Attorney, Agent, or Firm—Kinney & Lange

[57] ABSTRACT

An open roof construction for a vehicle with a roof opening, provided with an outer panel and an inner panel. The outer panel is pivotable from its closed position in the roof opening to a backwardly and upwardly inclined ventilating position and from this ventilating position may be moved back to the closed position. Simultaneously with the outward pivoting movement of the outer panel an adjusting means moves the inner panel backwards from its foremost position along a restricted distance.

24 Claims, 4 Drawing Sheets

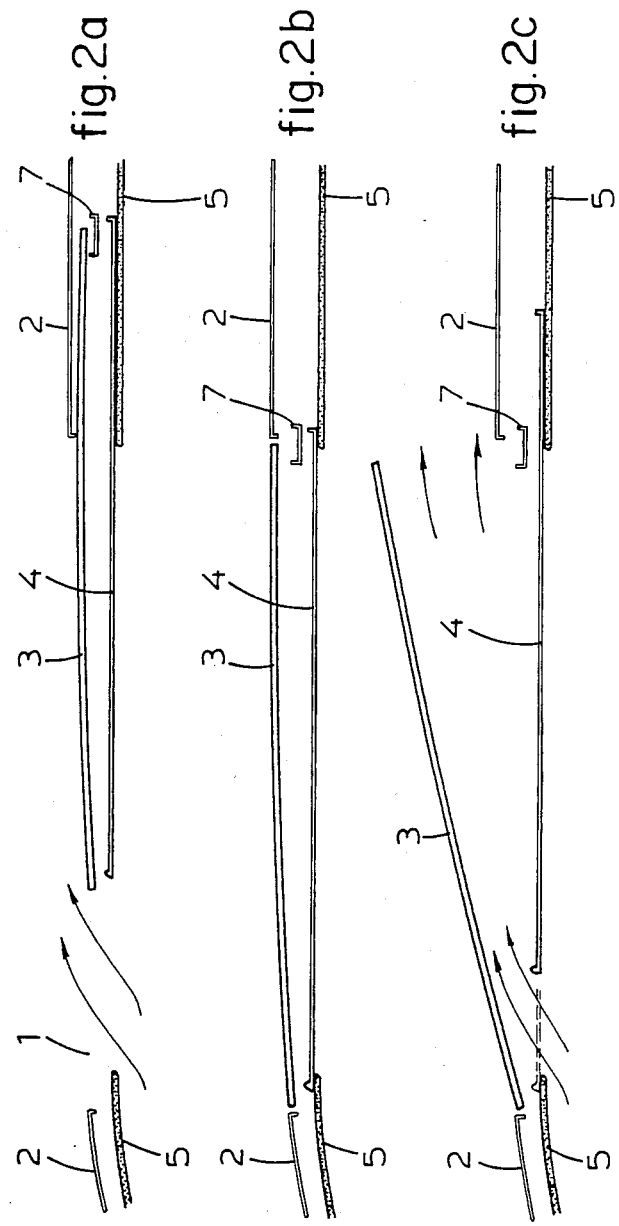

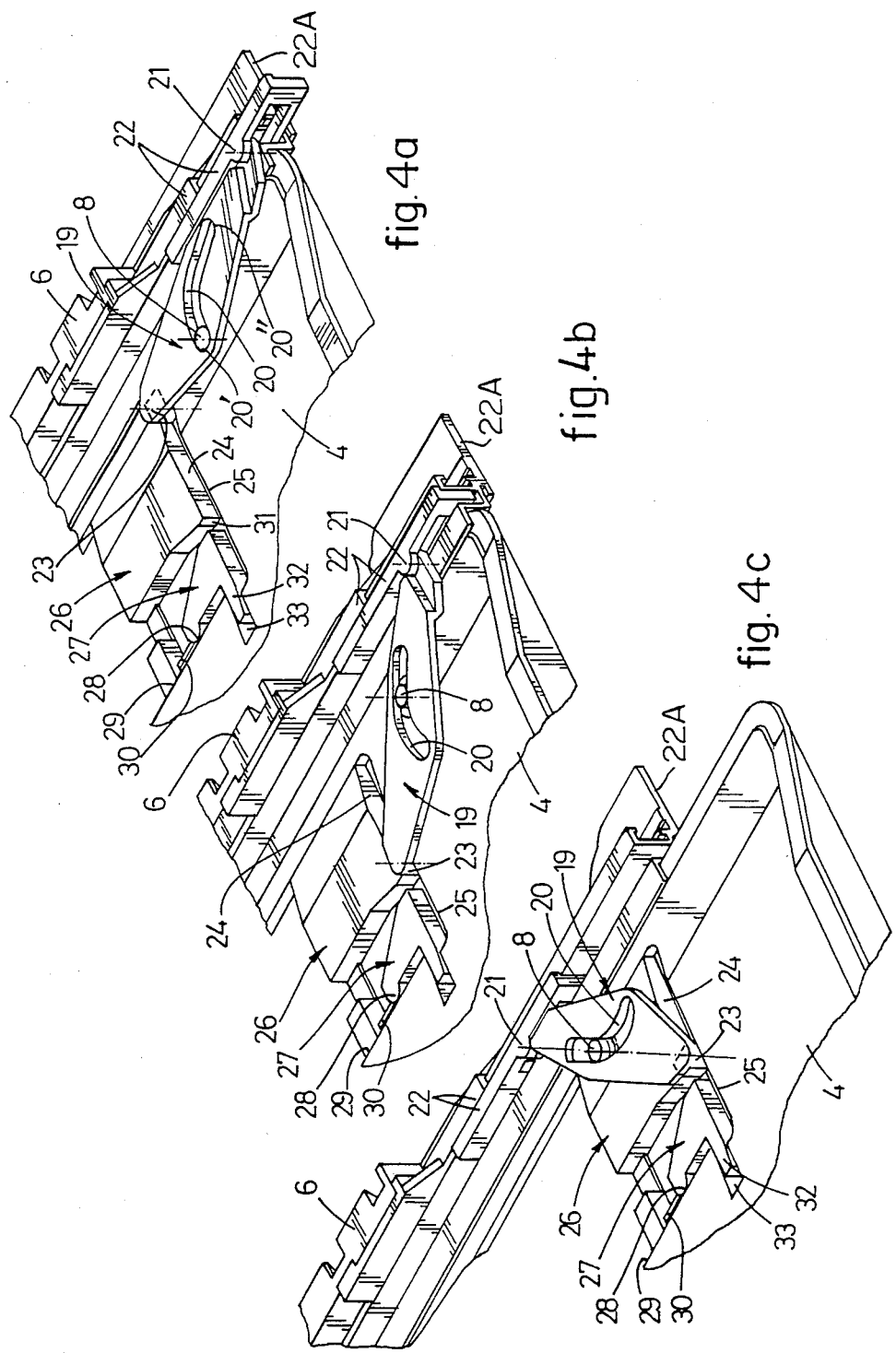

4,844,534

OPEN ROOF CONSTRUCTION FOR A VEHICLE

The invention relates to an open roof construction for a vehicle with a roof opening, provided with an outer panel and an inner panel, of which the outer panel is pivotable between a closed position in the roof opening and a backwardly and upwardly inclined ventilating position.

In a known embodiment of an open roof construction of this kind the inner panel is provided with a front part and a rear part, which parts are pivotable with respect to each other. When the outer panel pivots to the ventilating position, the front part of the inner panel remains in the closed position, while the rear part pivots upwards simultaneously with the outer panel. This known open roof construction releases a ventilating opening when the outer panel is brought into the ventilating position, which ventilating opening is positioned near the back of the roof opening.

This known open roof construction has the disadvantage that during driving of the vehicle an air stream escapes from the vehicle through this ventilating opening, which air stream moves around the heads of the passengers in the front seats, which is often experienced as unpleasant.

It is an object of the present invention to provide an open roof construction for a vehicle, with which the above disadvantage is removed in an efficient way.

For this purpose the open roof construction according to the invention is characterized in that simultaneously with the outward pivoting movement of the outer panel from the closed position to the ventilating position an adjusting means moves the inner panel backwards from its foremost position along a restricted distance.

In this way a ventilating opening is formed near the front of the roof opening, at which location the air stream is discharged into the atmosphere between the inner panel and the outer panel. Because the front of the roof opening is located at a distance before the heads of the passengers in the front seats, these passengers are not troubled by the developing air stream.

According to the invention it is also possible that simultaneously with the backward pivoting movement of the outer panel, the adjusting means moves the inner panel back to the foremost position from the restricted rearwardly moved position.

In an embodiment of the open roof construction, wherein the operation of the outer panel takes place by an operating mechanism mounted on at least one side, which operating mechanism comprises an element which is substantially horizontally slidable in the longitudinal direction of the vehicle, it is proposed according to the invention, that the adjusting means of the inner panel may be coupled with the slidable element of the outer panel.

In this way the displacement of the slidable element of the outer panel is utilized to adjust the inner panel.

In an embodiment of an open roof construction, wherein the slidable element is moved forward when the outer panel is brought into the ventilating position, it is advantageous that the adjusting means is a reversing element which converts the forward movement of the slidable element into a rearward movement of the inner panel.

The adjusting means for the inner panel may comprise a lever rotatable about a substantially vertically extending pivot shaft, which lever is adapted to engage the inner panel at its one end and is connected to the slidable element at its other end. In a preferred embodiment of the open roof construction according to the invention the lever is adapted to engage the inner panel slidably in the transverse direction at its one end and the lever is pivotally connected to the slidable element through a substantially vertically swivel shaft at its other end, the lever being slidable and pivotally engaged with the pivot shaft between both its ends.

In the embodiment of the open roof construction according to the invention, wherein the inner panel is slid backwardly and forwardly by the adjusting means when the outer panel is moved between the closed position and the ventilating position, it is advantageously if the adjusting means is provided with a cam engaging within a groove formed in the upper side of the inner panel, the front side of the groove being defined by a stationary element and a movable element, wherein there is provided a passage between the movable element and the stationary element forming an opening to the groove, the passage having a portion smaller than the cam so as to prevent the cam to pass through the passage in a first position of the movable element and the passage having a second portion larger than the cam so as to allow the cam to pass through the passage in a second position of the movable element.

In this way it is possible to mount and demount the inner panel without needing to loosen or detach the adjusting means for the inner panel. In the normal operating position a cam of the adjusting means is retained in the groove in the inner panel, and for demounting the panel the movable element is moved to the second position in order to allow the cam of the adjusting means to pass through the passage thereby releasing the inner panel from the adjusting means. The mounting operation of the inner panel is effected in the reverse sense.

It is preferred that the movable element is biased into the first position by a spring means and is able to be moved by the cam to the second position against the spring force of the spring means. The said spring means may be a bending rod.

The invention will hereafter be elucidated with reference to the drawing, which shows embodiments of the open roof construction according to the invention by way of example.

FIGS. 2a, 2b and 2c show schematic side views of the open roof construction according to FIG. 1, in various positions.

FIGS. 4a, 4b and 4c are perspective views of a part of a second embodiment of the open roof construction according to the invention, wherein a modified adjusting means for the inner panel is shown in different positions corresponding to the positions of the panels according to FIGS. 2a, 2b and 2c respectively.

In the embodiments like parts are indicated by like reference numerals.

Figure 1:
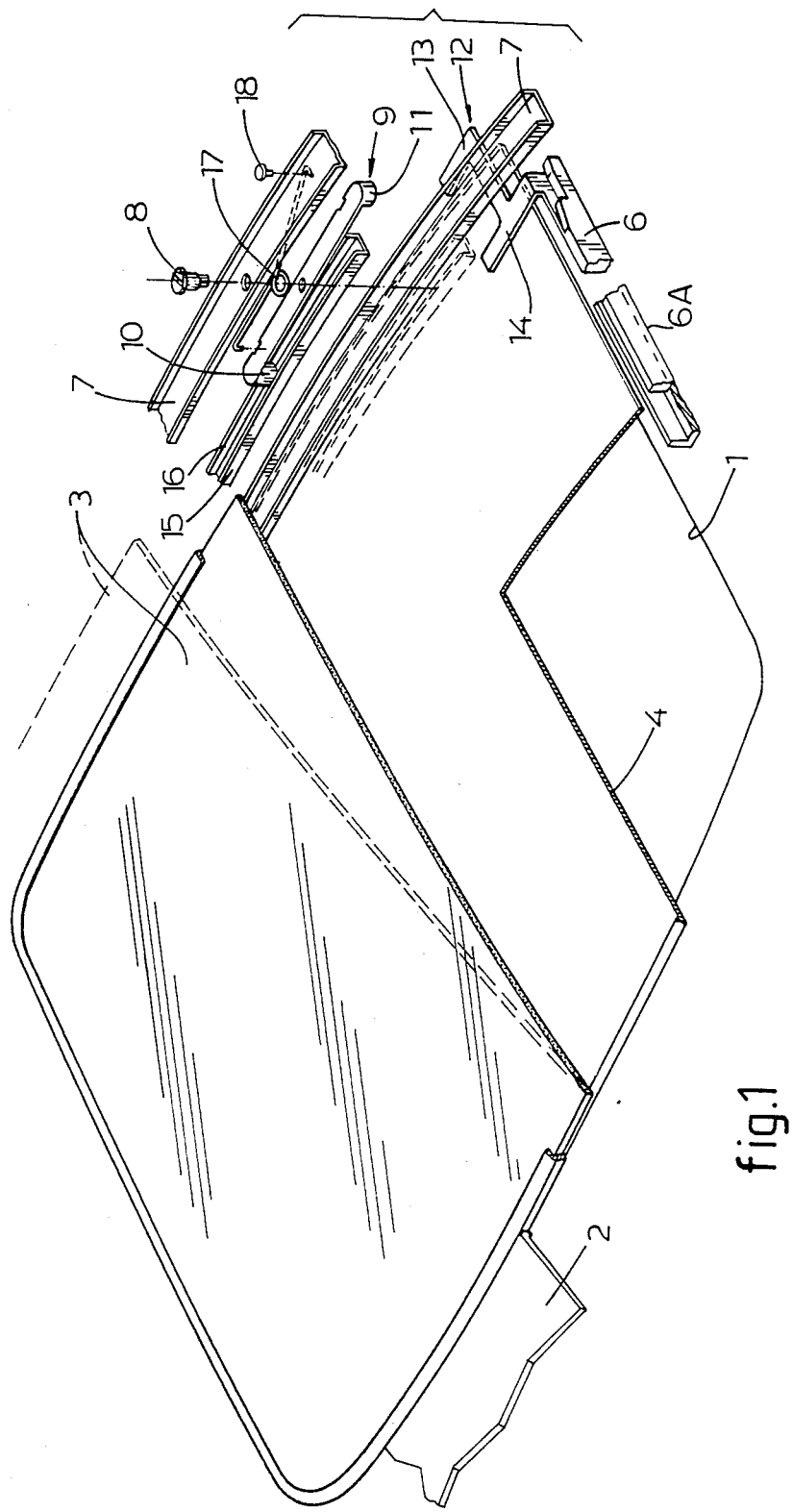
FIG. 1 is a schematic perspective view of a first embodiment of an open roof construction according to the invention, wherein a number of parts are detached.

The drawing shows two embodiments of an open roof construction for a vehicle which is provided with an opening 1 in the outer fixed roof 2.

This open roof construction comprises an outer panel 3 and an inner panel 4. In the embodiments shown in the drawing by way of example the outer panel 3 is formed of metal or another non-transparent material, and the inner panel 4 has the function of a lining in order to conceal the unfinished underside of the outer panel 3. Furthermore, the inner panel 4 improves the sound absorption and heat insulation.

As an alternative it is also possible that the outer panel 3 is manufactured from a transparent material, such as glass, while in that case the inner panel 4 has been constructed as a sun blind for excluding the light if desired when closing the roof opening 1.

Hereafter the embodiments shown in the drawing by way of example will first be dealt with in detail, whereafter the alternative embodiments will be elucidated.

The outer panel 3 may be brought from its closed position in the roof opening 1 to a lowest position, in which the outer panel 3 together with the inner panel 4 may be moved backwards between the fixed roof 2 and the inner roof 5 of the vehicle to a wholly or partly opened position (FIG. 2a) and from there may be moved back again to the closed position together with the inner panel 4 (FIG. 2b).

Furthermore, the outer panel 3 may be brought from its closed position to a backwardly (rearwardly) and upwardly inclined ventilating position (FIG. 2c) and from this ventilating position may be moved back to the closed position.

When the outer panel 3 is brought into the ventilating position, the inner panel 4 is moved backwards from its foremost position along a restricted distance, so that a ventilating opening is formed near the front of the roof opening (FIG. 2c). When the outer panel 3 is moved back from the ventilating position to the closed position, the inner panel 4 is again automatically moved to its foremost position.

The adjustment of the outer panel 3 takes place in a manner known per se, e.g. by means of an adjusting mechanism according to Applicant's U.S. Pat. No. 4,601,512, issued July 22, 1986, which is incorporated by reference, wherein the outer panel is controlled by a slide plate or plates 6 mounted on one or both sides in a stationary guide 6A so as to be slidable substantially horizontally in the longitudinal direction of the vehicle by cable-like push-pull means (not shown).

A water gutter 7 which extends in the transverse direction of the vehicle and which is composed of a lightly bent U-section, of which both legs extend upwardly, co-operates with the slide plate 6 in such a way that the water gutter 7 follows the sliding movement of the outer panel 3. However, when the outer panel 3 is pivoted from the closed position to the ventilating position, or to the lowermost position respectively and vice versa, the water gutter 7 remains locked in its foremost position. In this foremost position the water gutter 7 lies underneath the rear edge of the roof opening 1.

As the slide plate 6 is moved forward in order to bring the outer panel 3 from the closed position to the ventilating position, the relative movement which is thus effected between the slide plate 6 and the water gutter 7 can be used for adjusting the inner panel 4.

For this purpose, in the first embodiment according to FIGS. 1 and 3a, 3b and 3c, the water gutter 7 comprises a substantially vertically downwardly extending pivot shaft 8, with which a lever 9 is rotatably connected, which serves for automatically moving the inner panel 4. This lever 9 carries on both ends a downwardly extending cam 10 or 11, respectively, of which the cam 10 is in engagement with the inner panel 4, and the cam 11 may engage the slide plate 6 on the respective side of the open roof construction.

When using two slide plates 6 it is of course possible to apply two levers 9 symmetrically positioned with respect to the centre of the open roof construction, each of these levers 9 engaging one of the two slide plates 6.

In order to co-operate with the lever 9 the slide plate 6 is provided with a fork 12 mounted near the rear side thereof. This fork 12 comprises a rear leg 13 extending in the transverse direction of the vehicle, and a front leg 14 which is parallel to the leg 13, where the rear leg 13 extends behind the cam 11 of the lever 9, and the front leg 14 extends in front of the cam 11.

Figure 3A:
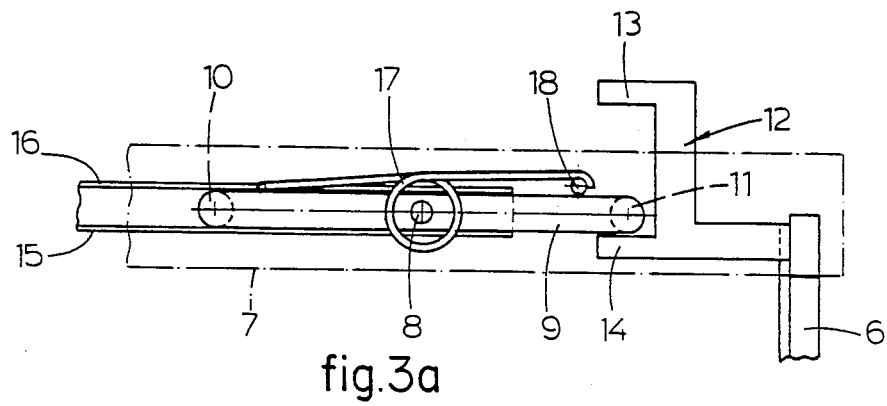
FIGS. 3a, 3b and 3c are schematic top views of a portion of the open roof construction according to FIG. 1 on a larger scale, wherein the adjusting mechanism of the inner panel is shown in various positions corresponding with the positions of the panel according to FIGS. 2a, 2b and 2c.
Figure 3B:
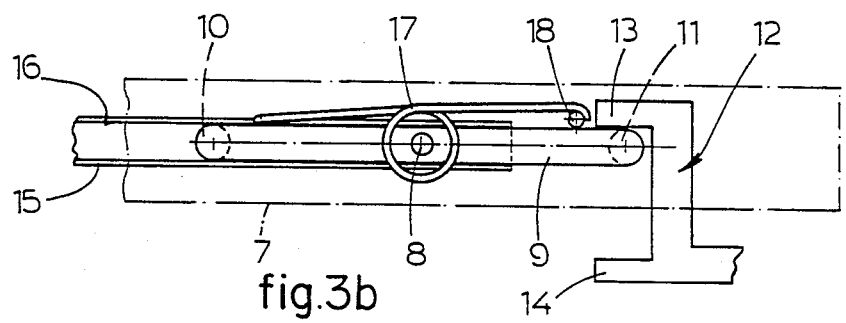

The front leg 14 and the rear leg 13 lie at such a distance from each other in the longitudinal direction of the vehicle, that when the outer panel 3 is brought from the lowest position to the closed position or vice versa, the movement of the slide plate 6 is equal to the distance between the legs 13 and 14 minus the thickness of the cam 11 (compare FIGS. 3a and 3b). Therefore, during this movement of the outer panel 3 the inner panel 4 does not move and in the closed position the rear leg 13 engages the cam 11 of the lever 9.

The cam 10 on the end of the lever 9 remote from the slide plate 6 is positioned between two upright edges 15 or 16, respectively, extending in the transverse direction of the vehicle, which upright edges 15, 16 are mounted on the inner panel 4 near the rear side thereof. The distance between the two upright edges 15 or 16, respectively, has been chosen in such a way that the cam 10 is received therebetween practically without play so that this cam can therefore only move therebetween in the transverse direction of the vehicle.

During the forward movement of the slide plate 6, in order to bring the outer panel 3 from its closed position (FIG. 3b) to the ventilating position (FIG. 3c), the rear leg 13 of the slide plate 6 moves the cam 11 of the lever 9 forward whereby the lever 9 is rotated about the pivot shaft 8 in such manner that the cam 10 moves backwards and the inner panel 4 is moved backwards through the upright edge 16.

In order to automatically bring back the inner panel 4 from the restricted rearwardly moved position to its foremost position the lever 9 is provided with a spring 17. This spring 17 is wound on the pivot shaft 8 near its centre. The loading end of the spring 17 is supported against the back of the lever 9 near the cam 10, whereas the other end of the spring 17 engages a pin 18 which extends downwards from the water gutter 7 and behind the lever 9. This pin 18 at the same time serves as a stop for the lever 9, if the same is in the rest position (FIGS. 3a and 3b).

Figure 3C:
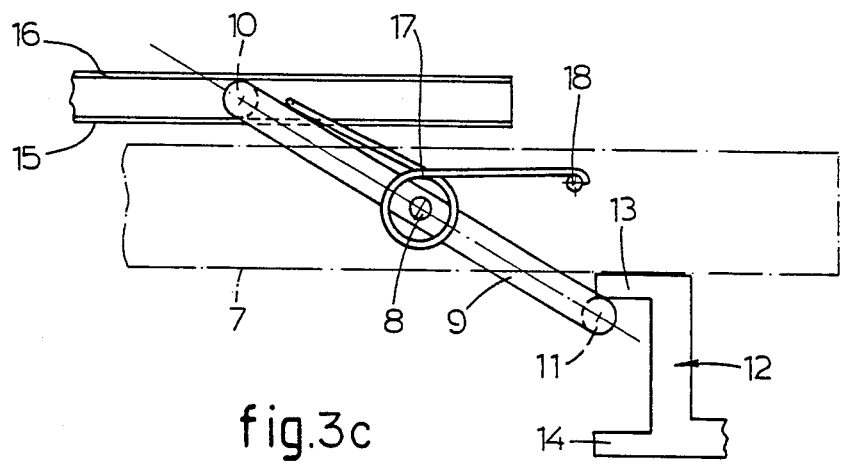

During the forward movement of the slide plate 6, in order to bring the outer panel 3 from its closed position (FIG. 3b) to its ventilating position (FIG. 3c), the spring tension of the spring 17 increases, which spring tension urges the cam 11 of the lever 9 against the front side of the rear leg 13 during the backward movement of the slide plate 6 (compare FIG. 3c and FIG. 3b). The cam 10 of the lever 9 then moves the inner panel 4 forward through the upright edge 15.

On the backward sliding movement of the outer panel 3 the movement of the lever 9 is locked by the pin 18 and the front leg 14, while the cam 10 of the lever 9 moves the inner panel 4 backwards through the upright edge 16, and when the outer panel 3 is reversely slid to the closed position, the cam 10 moves the inner panel 4 forward through the upright edge 15.

FIGS. 4a, 4b and 4c show a second embodiment of the open roof construction according to the invention, wherein the adjusting means for the inner panel 4 has been modified. In the second embodiment the lever 9 of the first embodiment is replaced by a lever 19, which comprises a curved slot 20 in its central part between both its ends, the pivot shaft 8 mounted to the water gutter (not shown) being engaged within said slot 20. The slot 20 has a portion adjacent its one end 20' which is curved in a plane perpendicular to the pivot shaft 8, and the portion connecting thereto and adjacent the other end 20" being straight. Said slot 20 causes the lever 19 to be pivotally and slidably connected to the water gutter 7.

At its one end the lever 19 is pivotally connected to a coupling piece 22 by means of a vertical swivel shaft 21, the coupling piece 22 being slidably engaged within a stationary guide 22A and being fixedly coupled to the slide plate 6. The lever 19 is provided with a downwardly extending cam 23 at its other end. The cam 23 at the lever 19 engages pivotally and slidably into a groove 24 formed in the upper side of the inner panel 4 and extending in the transverse direction thereof. The groove 24 is defined by an edge 25 at its rear side and by a stationary element 26 and a movable element 27 at its front side.

The movable element 27 is tiltable about a tilting cam 28 provided at the front end of the movable element 27 and facing away from the stationary element 26. The tilting cam 28 is supported against a longitudinal edge 29 of the inner panel 4. An elastic bending rod 30 extending in the longitudinal direction of the inner panel 4 is fixed into the front end of the movable element 27, while the bending rod 30 is rigidly supported in a fixed part of the inner panel 4 at its front end. The bending rod 30 elastically holds the movable element 27 in a first rest position illustrated in FIG. 4, and the movable element 27 is able to be tilted about the tilting cam 28 against the bending force of the bending rod 30 to a second position, the tilting movement being guided by means of a transverse leg 32 of the movable element 27, which slides against a guiding edge 33. In the rest position of the movable element 27 a passage 31 remains between this element 27 and the stationary element 26. Said passage 31 has an end opening backwardly into the groove 24 and the passage 31 diverges in the forward direction. The width of this passage 31 is smaller than the diameter of the cam 23 with the lever 19 in the rest position of the movable element 27, and said cam 23 may just pass through this passage 31 in the extreme tilted position of the movable element 27.

The operation of this embodiment of the adjusting means for the inner panel 4 is as follows.

In FIG. 4a the adjusting means is illustrated in a position, wherein the outer panel 3 is in the lower, and completely backwardly slid position. The inner panel 4 lies in its foremost closed position. The lever 19 is positioned in such a way, that the end 20' of the slots 20 abuts the pivot shaft 8 at the water gutter 7, while the lever 19 extends substantially forwardly, as seen from the swivel shaft 21 on the coupling piece 22.

FIG. 4b shows the adjusting means in a position, in which the outer panel 3 is in its closed position in the roof opening 1 (see FIG. 2b). To this end the slide plate 6 has been slid a distance forwardly. The inner panel 4 has been maintained in its foremost closed position and has therefore not been moved with respect to the position of FIG. 4a. The water gutter 7 and consequently the pivot shaft 8 fixed thereto are also still in the same position as in FIG. 4a. This means that the slide plate 6 and therefore the swivel shaft 21 between the lever 19 and the coupling piece 22 have been displaced with respect to the pivot shaft 8. Since a forward displacement of the swivel shaft 21 at the one end of the lever 19 is not allowed to cause a longitudinal displacement of the cam 23 at the opposite end of the lever 19, a curvature of the slot 20 in the lever 19 is chosen such, that a forward displacement of the swivel shaft 21 is converted in a transverse displacement of the cam 23 by means of a pivoting and sliding movement of the lever 19 with respect to the pivot shaft 8 on the water gutter 7. In FIG. 4b the pivot shaft 8 has reached the end of the curved portion of the slot 20.

FIG. 4c illustrates the adjusting means in a position, in which the outer panel 3 lies in the maximally upwardly tilted ventilating position according to FIG. 2c. For this purpose, the slide plate 6 has been moved further forwardly to its extreme foremost position. During this movement the swivel shaft 21 between the coupling piece 22 and the lever 19 has been carried along forwardly, whereby the lever 19 has been pivoted about the stationary pivot shaft 8 at the water gutter 7. The forward displacement of the swivel shaft 21 at the one end of the lever 19 is converted in at least a backward displacement of the cam 23 at the other end of the lever 19. During this movement a cam 23 carries the inner panel 4 along by means of the edge 25. The straight slot portion of the slot 20 adjacent the end 20" is only meant to compensate the change in the distance between the swivel shaft 21 between the coupling piece 22 and the lever 19 and the pivot shaft 8 at the water gutter 7. In the position according to FIG. 4c the pivot shaft 8 has passed through the straight slot portion of the slot 20 and the lever 19 two times with respect to the position of FIG. 4b.

When the outer panel 3 is moved in the reversed sense from the ventilating position to the downwardly displaced position through the closed position the movements of the adjusting means and the inner panel 4 take place in the same way, but in opposite direction.

According to another aspect of the invention the inner panel 4 is designed such, that despite the provision of the adjusting means for the inner panel 4, the inner panel 4 is adapted to be mounted and demounted without the need to detach or loosen any part of the adjusting means. For this purpose the movable element 27, which has been described hereinbefore, is provided.

The mounting operation of the inner panel 4 is as follows. The inner panel 4 is slid into its longitudinal guide from behind. The slide plate 6 is set in a position, wherein the lever 19 is in such a position, that the cam 23 at the free end of the lever 19 may be retained in the diverging front end of the passage 31 between the stationary element 26 and the movable element 27. As a consequence of the pressure of the cam 23 at the lever 19 onto a wall of the movable element 27 which is inclined in the transverse direction, this movable element 27 is pushed away in the transverse direction against the spring force of the bending rod 30, in such a way that the cam 23 is able to pass through the passage 31. When the cam 23 reaches the groove 24 the movable element 27 is moved back again to the rest position by the spring force of the bending rod 30, thereby restraining the cam 23 in the transverse groove 24 in the longitudinal direction of the inner panel 4.

The demounting operation of the inner panel 4 takes place in a similar way, but in opposite direction, wherein the cam 23 at the lever 19 should be placed at the entrance of the passage 31. The force which has to be exerted onto the inner panel 4 to pass the cam 23 of the lever 19 through the passage 31 should be considerably larger than the force onto the inner panel 4 which is needed to overcome the resistance exerted by the longitudinal guide onto the inner panel 4. In this way the cam 23 is prevented from accidentially being remove from the groove 24 through the passage 28.

As has already been mentioned the embodiments described apply to an open roof construction, wherein the outer panel 3 is non-transparent and the inner panel 4 functions as a lining. In that case, the movement of the panels with respect to each other can only be effected through the lever 9, or 19 respectively.

With a transparent outer panel 3 the inner panel 4 should also be capable of being moved independently of the outer panel 3, which may for instance be done by hand.

In order to make this possible in the first embodiment according to FIG. 1 and FIGS. 3a, 3b and 3c, a front upright edge 15 of the inner panel 4 should be omitted. Furthermore, the front leg 14 of the slide plate 6 is in fact superfluous in this case.

In the second embodiment according to FIGS. 4a, 4b and 4c, the stationary element 26 and the movable element 27 should be omitted.

In this alternative embodiment having a transparent outer panel 3, the inner panel 4 will be moved slidably backwardly from its foremost position in the way as described hereinbefore when the outer panel 3 is tilted from its closed position to its ventilating position.

The inner panel 4 is allowed to be freely moved backwardly from each position and to be moved forwardly again, until the upright edge 16, or 25 respectively of the inner panel 4 abuts the cam 10 of the lever 9 or the cam 23 of the lever 19 respectively.

The invention is not restricted to the embodiments shown in the drawing by way of example, which may be varied in several ways within the scope of the invention.

I claim:

1. An open roof construction for a vehicle having a roof opening comprising:
    an outer panel, pivotable between a closed position closing the roof opening and an upwardly and rearwardly inclined ventilating position;
    an operating mechanism for the outer panel, the operating mechanism being mounted on at least one side of the outer panel and including a slidable element which is slidably guided for movement along a longitudinal axis of the vehicle within a stationary guide, the slidable element being moved toward a front of the vehicle when the outer panel is moved from the closed position to the ventilating position;
    an inner panel lying below the outer panel and being slidably mounted to the stationary guide; and
    adjustment means for the inner panel, the adjustment means comprising a lever having two ends, one end thereof being adapted to engage the inner panel, the other end being operatively connected to the slidable element, the lever being rotatable about a substantially vertically extending pivot shaft which is mounted to a part of the open roof construction which is stationary during the pivoting movement of the outer panel, whereby upon forward movement of the slidable element to bring the outer panel into the ventilating position, the lever rotates about the pivot shaft under the action of the slidable element and thereby moves the inner panel rearwardly.

2. An open roof construction as claimed in claim 1, wherein the lever carries a cam near each end, the cam on the end of the lever adjacent the slidable element being positioned to be engaged by a leg mounted on the slidable element and extending transversely behind the cam as the slidable element is moved forwardly, and wherein the cam on the other end of the lever is adapted to cooperate with an upright edge mounted on the inner panel and extending transversely behind the respective cam.

3. An open roof construction as claimed in claim 2, wherein the lever is provided with a spring which near its centre is wound on the pivot shaft and one end of the spring is supported against a back of the lever near the cam which co-operates with the inner panel and an opposite end of the spring engages a pin which is stationary with respect to the pivot shaft, the spring being able to provide for a pivoting movement of the lever urging the inner panel toward its foremost position.

4. An open roof construction as claimed in claim 3, wherein said pin comprises a stop which co-operates with the lever to limit pivoting movement of the lever, with the leg of the slidable element released from engagement with the lever as the slidable element moves rearwardly.

5. An open roof construction as claimed in claim 4, wherein the pin comprises the stop for the lever.

6. An open roof construction as claimed in claim 5, wherein the roof opening is formed in a vehicle having a fixed roof and an inner roof spaced from the fixed roof, and wherein the outer panel may be brought from its closed position to a lowest position, in which the outer panel and the inner panel may be moved rearwardly between the fixed roof and the inner roof of the vehicle to an opened position and from there may be moved forward again, and the open roof construction is provided with a substantially horizontal water gutter which extends in the transverse direction of the vehicle, the pivot shaft for the lever being supported by the water gutter.

7. An open roof construction as claimed in claim 6, wherein the pin engaged by the spring is connected to the water gutter.

8. An open roof construction as claimed in claim 1, wherein the slidable element is moved rearwardly when the outer panel is moved from the ventilating position to the closed position of the outer panel, the lever of the adjusting means being engaged by a portion of the slidable element to convert the rearward movement of the slidable element to forward movement of the inner panel.

9. An open roof construction as claimed in claim 1, wherein the lever carries a separate cam near each of its ends, which cam on the end adjacent the slidable element is engaged by a leg which is formed on the slidable element and which extends transversely behind the cam when the slidable element moves forwardly and wherein the cam on the other end of the lever is positioned to co-operate with an upright edge mounted on the inner panel and extending transversely behind the respective cam.

10. An open roof construction as claimed in claim 9, wherein the lever is provided with a spring which is wound on the pivot shaft near the center of the lever, a first end of the spring being supported against a back of the lever near the cam which co-operates with the inner panel and a second end of the spring engaging a pin which is stationary with respect to the pivot shaft.

11. An open roof construction as claimed in claim 10, wherein said pin comprises a stop mounted on the open roof construction which co-operates with the lever to limit the maximum pivoting movement of the lever as the lever pivots under the urging of the spring.

12. An open roof construction as claimed in claim 11, wherein the inner panel is provided with a second, transversely extending, upright edge which extends in front of the co-operating cam of the lever such that the cam is confined in the direction of sliding movement of the inner panel between the first and the second upright edges.

13. An open roof construction as claimed in claim 12, wherein the vehicle has an outer fixed roof and an inner roof spaced from the fixed roof and wherein the outer panel may be brought from its closed position to a lowest position, in which the outer panel and the inner panel may be moved rearwardly between the fixed roof and the inner roof of the vehicle to an opened position and from there may be moved forward again, and wherein the open roof construction is provided with a substantially horizontal water gutter which extends in the transverse direction of the vehicle, the pivot shaft for the lever being supported by the water gutter.

14. An open roof construction as claimed in claim 13, wherein the pin engaged by the spring is connected to the water gutter.

15. An open roof construction as claimed in claim 14, wherein the slidable element is provided with a second transversely extending leg which extends in front of the cam of the lever adjacent the slidable element, and the second leg is positioned spaced forwardly of the first mentioned leg, the movement of the slidable element required for bringing the outer panel from the closed position to the lowermost position or vice versa being substantially equal to the distance between the first mentioned leg and the second leg of the slidable element less the thickness of the co-operating cam, the second leg thereby engaging the co-operating cam during rearward sliding movement of the outer panel.

16. An open roof construction as claimed in claim 8, wherein the lever is adapted to transversely slidably engage the inner panel at the one end of the lever and the lever being pivotally connected to the slidable element through a substantially vertically oriented swivel shaft connected to the other end of the lever, the lever being slidably and pivotally engaged with the pivot shaft at position between the opposite ends of the lever.

17. An open roof construction as claimed in claim 16, wherein the vehicle has a fixed outer roof and an inner roof panel spaced from the fixed outer roof and wherein the outer panel may be brought from its closed position to a lowest position, in which the outer panel and the inner panel may be moved rearwardly between the fixed roof and the inner roof of the vehicle to an opened position and from there may be moved forward again, and wherein the open roof construction is provided with a substantially horizontal water gutter which extends in the transverse direction of the vehicle, the pivot shaft for the lever being supported by the water gutter.

18. An open roof construction as claimed in claim 13, wherein the lever co-operates with the water gutter through the pivot shaft in such a way, that during the displacement of the outer panel between the closed position and the lowest position the forward and rearward movement of the one end of the lever adjacent the slidable element is converted into a transverse movement of the other end of the lever engaging the inner panel.

19. An open roof construction as claimed in claim 1, wherein the outer panel may be brought from its closed position to a lowest position in which lowest position the outer panel and the inner panel may be moved rearwardly between the fixed roof and the inner roof of the vehicle to a wholly or partly opened position, and from there may be moved forwardly again, and wherein the lever is provided with a slot being at least partially curved in a plane perpendicular to the axis of the pivot shaft, wherein the pivot shaft passes through the curved portion of the slot in the lever during the displacement of the outer panel between the closed position and the lowest position.

20. An open roof construction as claimed in claim 19, wherein the slot in the lever comprises a straight portion which is passed by the pivot shaft during the movement of the outer panel between the closed position and the ventilating position.

21. An open roof construction as claimed in claim 1, wherein the lever is provided with a cam engaging within a groove formed in the upper side of the inner panel, the front side of the groove being defined by a stationary element and a movable element, wherein there is provided a passage between the movable element and the stationary element forming an opening to the groove, the movable element being yieldable for permitting cam movement in the passage.

22. An open roof construction as claimed in claim 21, wherein the movable element is biased into the first position by spring means and is movable to the second position against the spring force of the spring means.

23. An open roof construction as claimed in claim 22, wherein the spring means is a bending rod.

24. An open roof construction as claimed in claim 21, wherein the movable element is provided with a tilting cam supported against an edge of the inner roof, the movable element being adapted to tilt about the tilting cam between the first and second positions.

* * * * *